(12) United States Patent
Buschmann et al.

(10) Patent No.: US 10,895,046 B2
(45) Date of Patent: Jan. 19, 2021

(54) PAVING TRAIN

(71) Applicant: JOSEPH VOEGELE AG, Rhein (DE)

(72) Inventors: Martin Buschmann, Neustadt (DE); Arnold Rutz, Ludwigshafen (DE); Achim Eul, Mannheim (DE); Henning Delius, Edenkoben (DE)

(73) Assignee: JOSEPH VOEGELE AG, Rhein (DE)

( * ) Notice: Subject to any disclaimer, the term of this patent is extended or adjusted under 35 U.S.C. 154(b) by 0 days.

(21) Appl. No.: 16/402,426

(22) Filed: May 3, 2019

(65) Prior Publication Data
US 2019/0338473 A1 Nov. 7, 2019

(30) Foreign Application Priority Data
May 4, 2018 (EP) .................... 18170768

(51) Int. Cl.
E01C 19/48 (2006.01)
E01C 19/10 (2006.01)
G01F 23/00 (2006.01)
G08C 17/00 (2006.01)
(Continued)

(52) U.S. Cl.
CPC .......... *E01C 19/1068* (2013.01); *E01C 19/48* (2013.01); *G01F 23/0076* (2013.01); *G08C 17/00* (2013.01); *H04W 88/085* (2013.01); *E01C 2019/207* (2013.01); *E01C 2019/2065* (2013.01); *E01C 2301/04* (2013.01)

(58) Field of Classification Search
CPC ................. E01C 19/1068; E01C 19/48; E01C 2019/2065; E01C 2019/207; E01C 2301/04; G01F 23/0076; G08C 17/00; H04W 88/085

USPC .................. 404/83, 84.05–85, 101, 108, 118
See application file for complete search history.

(56) References Cited

U.S. PATENT DOCUMENTS

| 5,846,022 | A | 12/1998 | Grundl |
| 5,921,708 | A | 7/1999 | Grundl et al. |
| 6,193,438 | B1 | 2/2001 | Heims |

(Continued)

FOREIGN PATENT DOCUMENTS

| CN | 1181438 A | 5/1998 |
| CN | 2677434 Y | 2/2005 |

(Continued)

OTHER PUBLICATIONS

European Search Report dated Aug. 7, 2018, Application No. EP18170768.8, Applicant Joseph Voegele AG, 9 Pages.

(Continued)

*Primary Examiner* — Raymond W Addie
(74) *Attorney, Agent, or Firm* — Brooks Kushman P.C.

(57) ABSTRACT

A paving train for producing at least one pavement layer on a traffic surface is formed from at least two independently driven units travelling in a group, such as a road finisher, a road paver, an IP finisher, a feeder, a supply unit or the like. The units move one behind the other at a given distance. In order to enable communication between the units via certain parameters such as speed, material filling level and the like, and in order also to easily control a corresponding distance between the units as well as the corresponding material transfer, a wireless communication link is formed between the units at least for exchanging speeds and/or material filling level.

20 Claims, 1 Drawing Sheet

(51) Int. Cl.
*H04W 88/08* (2009.01)
*E01C 19/20* (2006.01)

(56) References Cited

U.S. PATENT DOCUMENTS

| | | | |
|---|---|---|---|
| 7,572,081 | B2 | 8/2009 | Buschmann |
| 8,894,323 | B2 | 11/2014 | Rutz et al. |
| 9,963,836 | B1* | 5/2018 | Brenner .................. E01C 19/00 |
| 10,001,783 | B2 | 6/2018 | Zahr |
| 2009/0142133 | A1 | 6/2009 | Glee et al. |
| 2010/0215433 | A1* | 8/2010 | Fritz .................... G05D 1/0295 |
| | | | 404/84.5 |
| 2010/0296867 | A1 | 11/2010 | Buschmann et al. |
| 2011/0123267 | A1* | 5/2011 | Buschmann .......... E01C 19/004 |
| | | | 404/72 |
| 2011/0318102 | A1* | 12/2011 | Utterodt .................. E01C 19/48 |
| | | | 404/72 |
| 2012/0263531 | A1* | 10/2012 | Rutz ....................... E01C 19/23 |
| | | | 404/72 |
| 2012/0288328 | A1* | 11/2012 | Minich .................. E01C 19/23 |
| | | | 404/72 |
| 2013/0102335 | A1 | 4/2013 | Katagi et al. |
| 2015/0063907 | A1* | 3/2015 | Graham ................. E01C 19/48 |
| | | | 404/84.1 |
| 2016/0170415 | A1 | 6/2016 | Zahr |
| 2016/0215458 | A1* | 7/2016 | Weiler .................... E01C 19/48 |
| 2016/0222602 | A1* | 8/2016 | Downing ............... G01C 21/36 |
| 2017/0010621 | A1* | 1/2017 | Rio .......................... B60T 7/00 |
| 2017/0060126 | A1 | 3/2017 | Marsolek et al. |
| 2018/0297788 | A1* | 10/2018 | Grathwol ............... B65G 43/08 |
| 2019/0106846 | A1* | 4/2019 | Marsolek ............... E01C 23/07 |
| 2020/0117201 | A1* | 4/2020 | Oetken ................. G05D 1/0044 |

FOREIGN PATENT DOCUMENTS

| | | |
|---|---|---|
| CN | 210596931 U | 5/2020 |
| DE | 10 2014 018 533 A1 | 6/2016 |
| EP | 0 834 620 A1 | 4/1998 |
| EP | 1 837 442 A1 | 9/2007 |
| EP | 2 514 872 A1 | 10/2012 |
| JP | H03-168808 A | 7/1991 |
| JP | H03-199508 A | 8/1991 |
| JP | H04-122706 U | 11/1992 |
| JP | H06-149349 A | 5/1994 |
| JP | H09-184106 A | 7/1997 |
| JP | H10-207544 A | 8/1998 |
| JP | H11-336014 A | 12/1999 |
| JP | 2002-173908 A | 6/2002 |
| JP | 2012-046990 A | 3/2012 |
| JP | 2013-092857 A | 5/2013 |
| WO | 2017/034830 A1 | 3/2017 |
| WO | 2017/100312 A1 | 6/2017 |

OTHER PUBLICATIONS

Japanese Office Action Application No. 2019-080866 dated May 26, 2020, English Translation—Notification of Reason(s) for Refusal.
JP H03-168808 A, Abstract & Machine Translation.
JP H03-199508 A, Abstract & Machine Translation.
JP H04-122706 U, Machine Translation—Description & Claims (Abstract Not Available).
JP H06-149349 A, Abstract & Machine Translation.
JP H09-184106 A, U.S. Pat. No. 5,846,022.
JP H10-207544 A, U.S. Pat. No. 5,921,708.
JP H11-336014 A, U.S. Pat. No. 6,193,438 B1.
JP 2002-173908 A, Abstract & Machine Translation.
JP 2012-046990 A, Abstract & Machine Translation.
JP 2013-092857 A, US 2013/0102335 A1.
Japanese Office Action dated May 26, 2020, Application No. 2019-080866, 15 Pages.
European Search Report dated Aug. 7, 2018 Application No. 18170768, Letter identifiers that indicate relevance of the cited documents.
DE 10 2014 018 533 A1, U.S. Pat. No. 10,001,783 B2.
EP 0 834 620 A1, U.S. Pat. No. 5,921,708.
EP 1 837 442 A1, U.S. Pat. No. 7,572,081 B2.
EP 2 514 872 A1, U.S. Pat. No. 8,894,323 B2.
Chinese Office Action dated Nov. 25, 2020, Application No. 201910358924.1, 7 Pages.

* cited by examiner

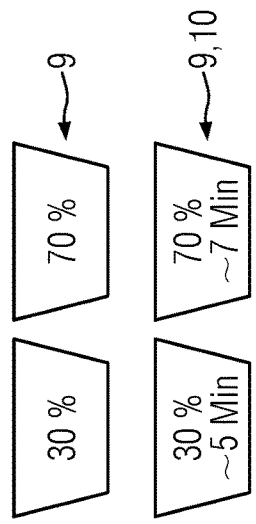
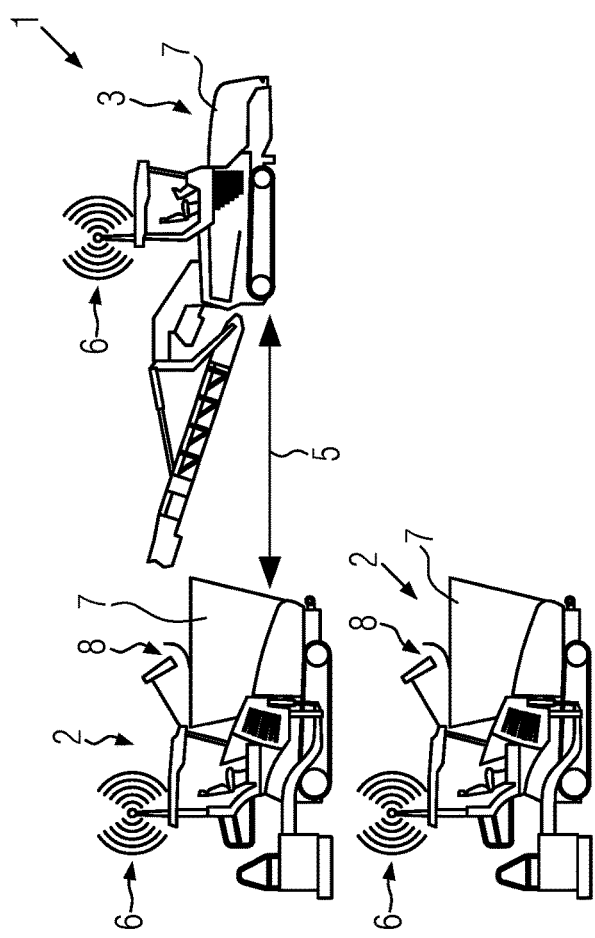
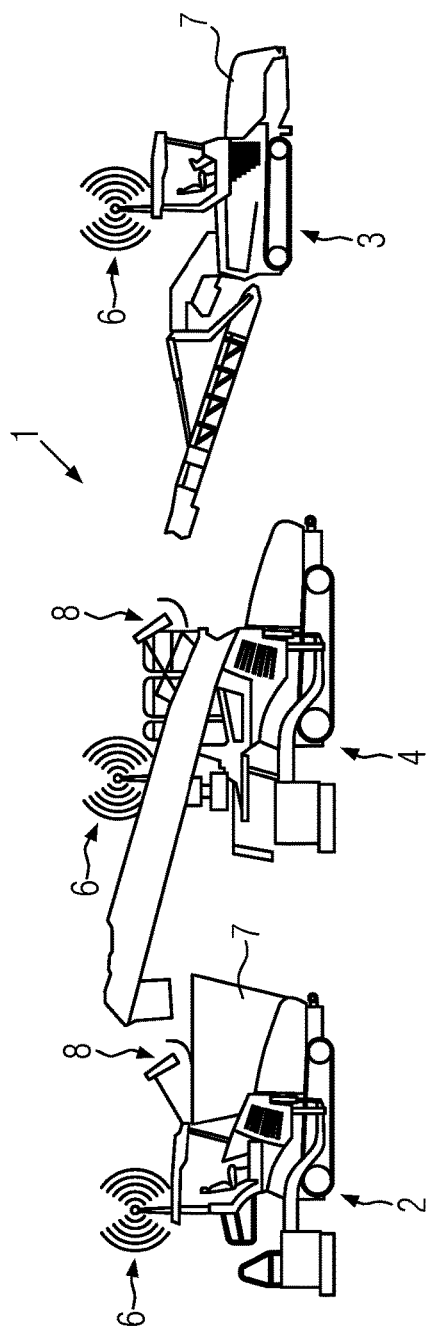

PAVING TRAIN

CROSS-REFERENCE TO RELATED APPLICATIONS

This application claims foreign priority benefits under 35 U.S.C. § 119(a)-(d) to European patent application number EP 18170768.8, filed May 4, 2018, which is incorporated by reference in its entirety.

TECHNICAL FIELD

The disclosure refers to a paving train for the production of at least one pavement layer on a traffic area. Such a paving train consists of two, or more independently driven, units travelling in a group. Such units are, for example, road finishers, road pavers, feeders, supply units or the like. These move one behind the other at a pre-defined distance.

BACKGROUND

This type of paving train is being used on an increasing number of road construction sites for paving asphalt or the like, where in addition to a road finisher, for example, feeders are also being used for non-contact asphalt transfer to the road finisher. The use of such a feeder and the resulting material buffer allows the asphalt to be paved without interruption. In other words, the road finisher or another finisher can produce the road continuously and the feeder follows the finisher at a pre-defined distance from the material transfer point. This avoids, for example, shocks caused by the docking of trucks.

It is therefore possible for the feeder to carry different mixes in two or more material buffers in the form of material buckets and transfer them to the finisher.

It is also possible, for example, for two finishers to be served by one feeder when paving hot on hot. In order to maintain a certain distance between the units in the paving train, it is known in practice that there is a corresponding distance control or a collision protection to control the corresponding distance between finisher and feeder.

It is also known from practical experience that an operator, in particular of a feeder, estimates how much material is still in the material buffer of the finisher in question or is in the transfer phase and, in the case of two finishers in particular, then has to decide which finisher has to be fed with mix. This also applies to the corresponding distance control, according to which the feeder in particular adapts to the finisher's paving speed. In other words, essentially only the feeder must be equipped with an appropriate distance control so that it can follow the speed of the finisher. As an emergency measure, the drive-on guard can be designed to prevent the feeder from driving too close to the finisher if it is unable to maintain the appropriate distance.

SUMMARY

The present disclosure is based on the object of enabling appropriate communication of certain parameters, such as speed, material level and the like, and of easily controlling both an appropriate distance between the units and the corresponding material transfer.

The disclosure is characterized in particular by the fact that a wireless communication link is formed between the units at least for the exchange of speeds and/or material level.

This means that the use of a wireless communication link can, for example, show an operator of a feeder or finisher how much material is still available in the material hopper or buffer. This makes it easier and better for the operator to decide how much material is to be transferred to which finisher or how much material is still present. In addition, when measuring speeds, it is possible, for example, for the finisher to set the paving speed on site and for the feeder to follow. However, a finisher operator is usually unable to determine directly whether the feeder can still feed the finisher with sufficient material. The wireless communication link, however, allows the paving speed, for example initiated by the feeder, to be slowed down in good time if a corresponding material level at the feeder is relatively low. The wireless communication link can also be used to start the units after a stop or to stop them.

In addition to the wireless communication link, the respective unit can also have collision protection as an emergency measure. This prevents, for example, a too small distance between the units in the event of a failure of the wireless communication connection.

It has already been pointed out that a finisher can be used to set the appropriate paving speed. The feeder then follows or travels ahead of the finisher at the appropriate speed, whereby the finisher can transmit the paving speed to the feeder via the wireless communication link. If, however, the material level at the feeder drops below a specified level, the feeder in particular can change the paving speed via the wireless communication link, and in particular reduce it.

In addition, embodiments according to the disclosure allow further speeds to be transmitted so that, for example, the finisher can transmit a target paving speed and/or a current target speed to a feeder. By means of this corresponding information via the wireless communication link, the feeder follows or travels ahead of the finisher according to the target paving speed or current target speed.

It is also possible, for example, to transmit a current speed from the feeder to the finisher via the wireless communication link, so that the finisher can adapt its paving speed to the speed of the feeder if necessary. This information can also be transmitted from the feeder to the finisher via the flowing material flow and/or via a filling quantity in the existing material hopper or buffer. The speed of the finisher can also be adapted to the feeder with regard to these two parameters.

In addition, by transmitting this data, the current filling quantities of the feeder at the finisher or for the finisher driver are known.

It can also be advantageous if the feeder has at least two material hoppers or buffers with different mixes. This makes it possible to deliver the respective mix from one of the material buffers to the finisher, whereby the corresponding mix change can also be communicated via the wireless communication link. This also applies to the corresponding quantity in the respective material buffer or material flow.

The feeder can be equipped with a filling level indicator in order to check the filling quantity in the material hopper or buffer in a simple manner and adapted to the wireless communication link. This means that the feeder driver is always informed about the current filling quantities of the respective material buffer. The corresponding information can also be transmitted to the finisher via the wireless communication link.

A simple way to measure the filling level and then display it can be seen in the finisher if appropriate sensors are installed, such as ultrasonic sensors, cameras, 3D sensors or the like.

In order to enable the display not only of the filling level, but also, if necessary, of the time until the corresponding material is used up, the filling level display device can also be designed for time display or a separate time display can be provided next to the filling level display device for displaying the time until the filling quantities present in the material hopper or bullet are used up.

At this point, it should be noted that a corresponding filling level on the finisher can also be measured using such sensors. A current filling quantity from the finisher can also be available at the feeder, so that the subsequent delivery of material can be adapted accordingly by the feeder. Of course, the finisher operator can also be informed of the finisher's filling level by means of corresponding filling level display devices and/or time displays.

It is also possible, for example, to assign a feeder to two finishers in particular. This means that by using the wireless communication link, a corresponding feeder driver can be informed which finisher still has how much material available in the material hopper or buffer and, if necessary, when new material should be fed to which finisher. This ensures that the feeder driver always has access to the current filling quantities of the material buffers of both finishers.

The wireless communication link can be used to transmit parameters such as the respective finisher's filling level and/or estimated time until the filling quantity is used up from the corresponding finisher.

In order to be able to calculate the corresponding time until the consumption of the filling quantity, flow rates from the past can be used, for example, so that the expected time until the consumption of the corresponding material can be calculated on the basis of the corresponding filling quantities and the flow rates known from the past.

Various standards are conceivable for the wireless communication connection, such as WLAN, Bluetooth, Zigbee, Wibree, Wimax, free-space optical communication or similar. All these standards have a sufficient range to establish an appropriate wireless communication link between the units of a paving train. In order to avoid external influences of the wireless communication link, it is also possible to transmit the corresponding data in encrypted form via the wireless communication link.

According to the disclosure, a feeder can also influence the speed of a paving train based on possible material flows and remaining level of material at the feeder, for example. In addition, corresponding parameters can be easily exchanged between finishers and feeders, e.g., in order to query filling levels at all units by means of a corresponding filling level measurement and to display them for each unit. Furthermore, the distance between the units of the paving train is controlled in a simple way, since the paving speed can be changed by each of the units through the wireless communication link through appropriate interaction of all units. This also applies to starting up after a stop, where in this context the current target speed and a corresponding target paving speed of each of the units is available or can be interrogated.

In the following, advantageous embodiments of the disclosure are explained in more detail with reference to the attached drawings.

BRIEF DESCRIPTION OF THE DRAWINGS

FIG. 1 shows a paving train consisting of two finishers and a feeder;

FIG. 2 shows a paving train consisting of road finisher, IP finisher and feeder; and FIG. 3 shows the principle of displays for the material filling level or usage time.

DETAILED DESCRIPTION

FIG. 1 shows a feeder 3 for feeding two road finishers 2. These vehicles form a paving train 1 for producing at least one pavement layer on a traffic area. Each of the units 2, 3 is driven independently and these drive in a group to enable, for example, uninterrupted paving of asphalt. Each of the two finishers 2 has a corresponding material hopper or buffer 7, into which the feeder 3 can deliver additional material. Corresponding filling levels of the material buffers 7 can be determined by a filling level sensor 8, whereby such a filling level sensor is, for example, an ultrasonic sensor, a camera, a 3D sensor or the like. A wireless communication link 6 is established between the units, which can be used, for example, to control a distance 5 between road finisher 2 and feeder 3. Such distance control is achieved, for example, by transmitting a target paving speed or the current target speed from the finisher to the feeder. This means that the feeder follows or travels ahead of the finisher at the appropriate speed in order to maintain the required distance 5. At this distance 5, the finisher can still be loaded with material from the feeder 3.

Furthermore, in the embodiment shown in FIG. 1, it can be seen via the wireless communication link on the feeder 3 which finisher 2 still has how much material available. Referring also to FIG. 3, the feeder driver is shown how much material is still available in the respective material buffer 7 of the corresponding finisher 2. This enables the feeder driver to determine in good time and reliably how much material should be transported to which finisher and when. This means that the feeder driver can switch from one finisher to another as soon as he has received the relevant information via the wireless communication link. According to the disclosure, the feeder driver therefore always knows the current filling quantity of the two finishers. In addition to the corresponding filling quantity, the feeder driver can also see the estimated time until the existing quantities are used up at the finisher, see again FIG. 3 with the percentage data for the filling level indicator devices 9 or percentage data and time data for the filling level indicator device with time display 9, 10.

The corresponding times can, for example, be calculated on the basis of the measured filling quantities and flow rates known from the past at the finisher.

In both FIG. 1 and FIG. 2, further parameters, such as the finisher's paving speed, are transmitted via the wireless communication link so that the feeder can adapt to the finisher. In addition, a collision protection can be provided between the units of paving train 1, which, for example, prevents the units from being too close together if the wireless communication link fails.

According to the disclosure, this allows the finisher to set the corresponding speed for the paving train. However, in some cases the finisher driver is unaware of any bottlenecks in the feeding of mix from the feeder. The wireless communication link enables feedback to the finisher driver. This enables the finisher driver to reduce the paving speed. This can also be done by the feeder, as it also has the corresponding displays in FIG. 3 for its material buffers and its material consumption time.

In addition, the wireless communication link is used to determine the corresponding parameters when starting up after a stop or when stopping the units of the paving train. This can be improved, for example, by transmitting current target speeds between the units. Similarly, the corresponding parameters can also be reported via the wireless communication link from the feeder, e.g., see material level or time till consumption of the material. This means that these parameters can also be used by the finisher to adjust the paving speed according to these parameters.

In FIG. 2, the corresponding paving train 1 consists of three units, see road finisher 2, Inline-pave (IP) finisher 4 and feeder 3. These can travel one after the other with the appropriate distance control, see the embodiment for FIG. 1, whereby it is also possible to change the arrangement of the units. Here, too, there is a corresponding transmission of parameters between the units, see as parameters the paving speed, nominal paving speed, current nominal speed, material filling levels or time for material consumption. The corresponding wireless communication link 6 exists between all units.

It should also be noted that it is also possible, for example, for the feeder to have two material buffers with different mixes, so that the corresponding material can be transferred to the finisher as required. This means, for example, that different material can be fed to the different finishers as shown in FIG. 1.

This also applies analogously to FIG. 2.

FIG. 3 shows the corresponding displays for two material buffers, for example, see level indicator 9 with 30% and 70% material respectively in the material buffers of two finishers or in two material buffers of a feeder. FIG. 3 also shows a further example where the level indicator 9 also has a time display 10. This shows that, for example, the 30%-filled material buffer can still be fed to the finisher for five minutes, or the 70%-filled material buffer can still be fed for seven minutes. However, this can also be an indication of the time remaining for two different finishers to empty their material buffers.

What is claimed is:

1. A paving train for producing at least one pavement layer on a traffic surface, the paving train comprising:
at least two independently drivable units for traveling in a group, which units are movable one behind the other at a predeterminable distance, wherein the at least two units comprise a feeder and one of a road finisher, a road paver, or an IP finisher, and wherein the feeder is configured to supply material to the road finisher, the road paver, or the IP finisher; and
a wireless communication system for forming a wireless communication link between the at least two units at least for exchanging material level data and at least one of paving speed data or material flow rate data, so that distance between the feeder and the road finisher, the road paver, or the IP finisher may be controlled based on the material level data and at least one of paving speed data or material flow rate data.

2. The paving train according to claim 1 wherein data can be transmitted in encrypted form by means of the wireless communication link.

3. The paving train according to claim 1 wherein at least one of the at least two units has a collision protection.

4. The paving train according to claim 1 wherein the at least two units comprise the road finisher and the feeder.

5. The paving train according to claim 4 wherein a paving speed can be predetermined by the road finisher and can be changed by the feeder via the wireless communication link.

6. The paving train according to claim 4 wherein a desired paving speed and/or current desired paving speeds can be transmitted to the feeder by the road finisher.

7. The paving train according to claim 4 wherein the feeder has a material hopper, and wherein a current speed and/or a filling quantity of the material hopper can be transmitted from the feeder to the road finisher.

8. The paving train according to claim 7 wherein the current speed is a material flow rate.

9. The paving train according to claim 1 wherein the feeder has at least two material hoppers for receiving different mixed materials.

10. The paving train according to claim 1 wherein the feeder has a filling level indicator device.

11. The paving train according to claim 1 wherein sensors are arranged for level measurement.

12. The paving train according to claim 11 wherein the sensors comprise an ultrasonic sensor, a camera, or a 3D sensor.

13. The paving train according to claim 1 wherein the feeder has a material hopper and a time display device for displaying time until a filling quantity present in the material hopper is used up.

14. The paving train according to claim 1 wherein the at least two units comprise the feeder, the road finisher and an additional road finisher, and the feeder is assigned to the two road finishers, and wherein an operator of the paving train can transmit a current material stock of each road finisher by means of the wireless communication link.

15. The paving train according to claim 14 wherein each road finisher has a material hopper and can transmit to the operator at least a filling level and/or an estimated time until a filling quantity of the material hopper is used up.

16. The paving train according to claim 1 wherein the at least two units comprise the road finisher having a sensor for measuring a filling level on the road finisher.

17. The paving train according to claim 16 wherein the sensor comprises an ultrasonic sensor, a camera, or a 3D sensor.

18. The paving train according to claim 1 wherein the wireless communication system is configured to establish the wireless communication link using WLAN, Bluetooth, ZigBee, Wibree, Wimax, or optical directional radio.

19. A paving train for producing at least one pavement layer on a traffic surface, the paving train comprising:
at least two independently drivable units for traveling in a group, wherein the at least two units are movable one behind the other at a predeterminable distance; and
a wireless communication system for establishing a wireless communication link between the at least two units for communicating speed and/or material level data;
wherein the at least two units comprise two finishers and a feeder assigned to the two finishers, and wherein an operator of the paving train can transmit a current material stock of each finisher by means of the wireless communication link.

20. The paving train according to claim 19 wherein each finisher has a material hopper and can transmit to the operator at least a filling level and/or an estimated time until a filling quantity of the material hopper is used up.

* * * * *